Nov. 7, 1944. L. C. ANDERSON 2,362,338
VALVE
Filed Nov. 6, 1942
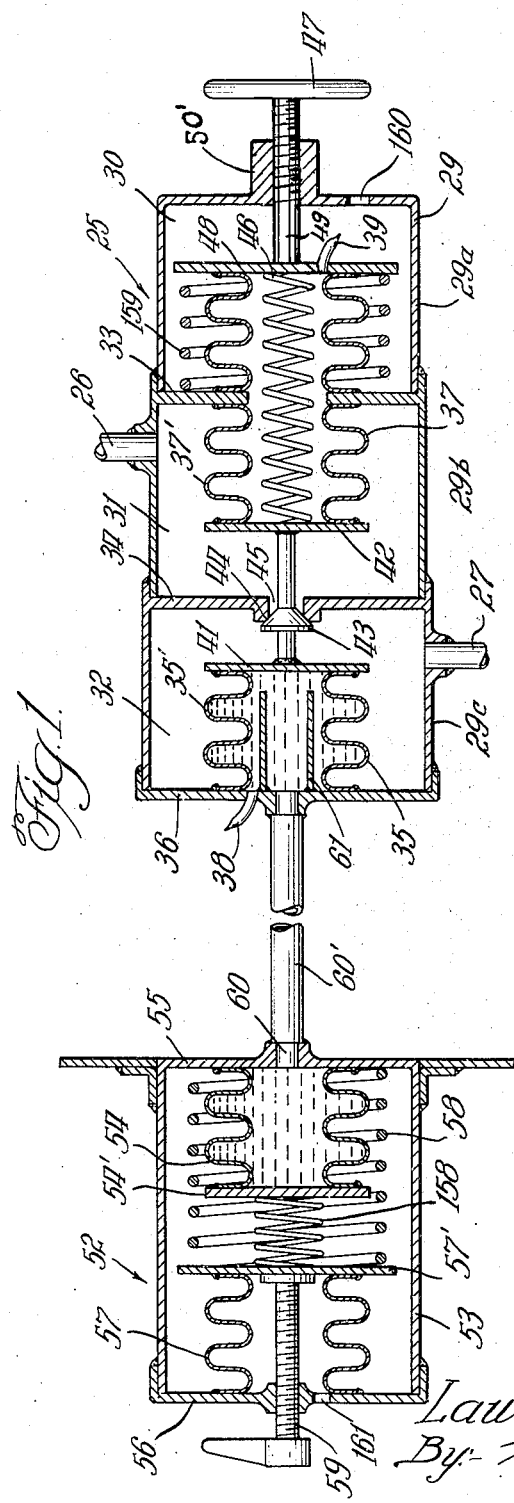
Inventor:
Lawrence C. Anderson
By Mann, Brown & Co.
Attys.

Patented Nov. 7, 1944

2,362,338

UNITED STATES PATENT OFFICE 2,362,338

VALVE

Lawrence C. Anderson, Chicago, Ill., assignor to Pullman-Standard Car Manufacturing Company, Chicago, Ill., a corporation of Delaware Application November 6, 1942, Serial No. 464,815

2 Claims. (Cl. 236—98)

Because of the great strides that have been made in the field of air conditioning, the public in general has become air conditioning conscious. It expects ideal temperature conditions and is critical if the existing conditions fail to meet its standards.

This has been particularly true in railroad passenger car service. The railroads in the past few years have been very active in air conditioning their equipment, and a large amount of publicity has been given to this development. The travelling public expects to be comfortable at all times while riding in modern passenger car equipment. It fails to understand the difficulties which have confronted engineers, and, when temperature conditions are not what it thinks they should be, its criticisms are many.

The problems which have confronted the air conditioning engineers are unique in so far as they relate to moving vehicles. One of these problems is the effect which changes in atmospheric pressures have on the operation of heat control valves. These changes in pressure have a direct effect upon the critical temperatures of operation of the heat control valves, and in some instances these critical temperatures have varied as much as four degrees or more due to barometric pressure changes. This condition, of course, is very objectionable, because it means the difference between satisfactory and unsatisfactory temperature conditions in the car.

One of the principal objects of the present invention is to provide a relatively simple, highly efficient control valve for a heating system, and one which is readily adjustable and is unaffected by changes in atmospheric pressures.

Other objects and advantages will become apparent as the disclosure proceeds and the description is read in conjunction with the following drawing, in which Fig. 1 is a vertical sectional view through the valve and control thermostat forming the subject matter of the present invention;

Fig. 2 is an end view of the control thermostat shown in Fig. 1 indicating the regulating dial for adjusting the temperature of operation of the heat control valve; and Fig. 3 is a fragmentary view of a modified form of thermostatic control means for operating the control valve shown in Fig. 1.

This is a continuation in part of applicant's copending application Ser. No. 428,153, filed January 26, 1942.

Referring to Fig. 1, the heating valve, known as a modulating heating valve, is shown generally at 25, and comprises a housing 29 made up of segments 29a, 29b, and 29c forming three separate chambers indicated at 30, 31, and 32, respectively. Chambers 30 and 31 are separated by a partition 33, and chambers 31 and 32 are separated by a wall or partition 34. Passing through the outer wall of the valve housing into the chamber 31 is an inlet pipe 26, and passing through the wall of the valve housing and exhausting from chamber 32 is an outlet pipe 27.

In chamber 32 is bellows 35 of copper or other suitable material, soldered or otherwise secured to the end wall 36 of the valve housing 29. As shown, the bellows is made up of a side member 35' and an end plate 41, soldered or otherwise secured to the side member 35'. A second bellows 37 is housed partly in chamber 30 and partly in chamber 31, and passes through the partition or wall 33 separating these two chambers. The bellows 37 as shown comprises a side member 37' and end plates 42 and 48, respectively, soldered or otherwise secured to the side member 37'. Copper tubes 38 and 39, passing respectively through end wall 36 and plate 48, provide access to the interior of bellows 35' and 37', respectively, to permit evacuation of air and gases from within the bellows, and the tubes are pinched closed after the air has been exhausted and the bellows 35 has been filled with oil, as will presently be described.

Bellows portion 37' is exposed to the temperature of the medium passing through chamber 31. Unless the air is exhausted from bellows 37, the operation of the valve may be affected by temperature changes in chamber 31, causing expansion and contraction of any air in the bellows 37.

Extending between the plates 41 and 42 on bellows 35 and 37, respectively, is a rod 40 passing through an opening 45 or passage in the wall 34. This rod is firmly secured to the plates 41 and 42. A valve member 43 is carried by the rod 40 and is integral therewith. This valve is tapered and is adapted to fit into a valve seat 44 in the passage 45, thereby closing off the passage between chambers 31 and 32.

A spring 46 is housed within bellows 37 to connect mechanically the plate 42 to plate 48. A manually operated regulating screw 47 having a shank 49 passes through the housing 29 and engages the plate 48. A suitable bushing 50 surrounds the shank 49 of the adjusting screw 47, and is threaded or otherwise secured to a boss 50' projecting from the end wall of the valve casing 29.

As shown, the valve housing 29 is made up of three parts 29a, 29b, and 29c, all soldered or otherwise suitably secured together. The end wall 36 is soldered to the section 29c. This particular segmentation is for the purpose of disclosure only, and obviously many other arrangements would be satisfactory.

A thermostatic element, generally indicated at 52, is located in the space to be heated and comprises a housing 53 in which is mounted bellows 54, secured to one face 55 of the housing 53. The housing is open at one end and a cover 56 closes this opening and is soldered in place. A bellows 57 is soldered to the cover and extends inwardly in the housing 53. The ends of bellows 54 and 57 as shown constitute plates 54' and 57', respectively. An adjusting screw 59 engages the face of plate 57' to regulate the degree of expansion of bellows 57, and a compression spring 58 extends between plate 57' and the end wall 55 of housing 53. This spring urges the bellows into a contracted position opposing the force exerted by the screw 59, thus resisting any tendency for the bellows to expand due to increases in pressure inside bellows 57. This is to compensate for any increase in atmospheric pressures which may be encountered.

Extending between the thermostatic element 52 and the modulating valve 25 is a tube 60 communicating with the interiors of bellows 54 and 35, and a cylindrical tube 61 is positioned inside bellows 35 over the end of tube 60. Armor tubing 60' surrounds tubing 60.

Some suitable operating medium, such as light oil, fills bellows 54 and 35 and tube 60 to impart movement to valve 43 in response to the requirements of the thermostat 52. This medium is preferably a liquid having a low freezing point so that the tube 60 may be placed underneath the car without danger of freezing the liquid in cold weather. Liquid also has the advantage over a gas because there is no appreciable expansion or contraction of the medium due to the temperature changes to which it will be exposed under normal operating conditions.

The thermostatic element 52 is manually adjusted to operate at a predetermined temperature, say, for example, 74 degrees. This is done by manipulation of the adjustment screw 59, which moves plate 57' and finally bellows 54 through a spring secured between plates 57' and 54'.

In other words, the force or resistance exerted by spring 46 is equal to the combined resistance of spring 158 and the pressure of the volatile liquid in the thermostatic element 52.

When initially adjusting the location of valve member 43, both screws 47 and 59 are manipulated so that the entire system is placed in a state of equilibrium. These adjustments can be made without disturbing the vacuums in those elements normally under vacuum, and when the adjustment is complete the system is extremely sensitive to slight changes in temperatures surrounding the thermostatic element 52.

The springs 46 and 158 are so proportioned that the resistances exerted on both sides of the floating valve 43 are balanced.

The thermostatic element 52 is filled with a volatile liquid, as, for example, ethyl or methyl chloride, which volatilizes at a relatively low temperature.

The modulating heat valve 25 functions as follows: As the temperature in the space to be heated drops below 74 degrees, the vapor in housing 53 of the thermostatic element 52 contracts, thereby allowing bellows 54 to expand. A light oil is contained within the bellows 54, tube 60, and bellows 35, so that, as the bellows 54 expands, the pressure on this oil is lowered, thereby permitting the force of spring 46 in the modulating heat valve 25 to force valve member 43 away from the valve seat 44 to open the passage between chambers 31 and 32. The valve member 43 is moved with respect to valve seat 44 until the system is again placed in a state of equilibrium. Consequently, the valve opening may be entirely closed or opened to any degree, depending upon pressure conditions within the housing 53 of the thermostatic element 52. Thus, the action of the modulating heat valve 25 is a throttling action and not a mere open-and-close action. When the temperature of the space to be heated reaches 74 degrees, the vapor pressure within housing 53 increases to contract bellows 54, thereby closing the passage between chambers 31 and 32 of the modulating heat valve 25.

As shown in Fig. 1, the thermostatic element 52 has a manual adjustment feature for regulating the temperature of operation of the thermostat. The adjusting screw 47 is merely for adjusting the valve to initially set the system for proper operation, and for later adjusting purposes. It may be desirable, however, to use a reservoir 104 as the thermostatic element housing a volatile liquid for operating the bellows 35. In this case, a tube 105 connects the reservoir 104 with the interior or bellows 35 in the same manner as indicated in Fig. 1. Variations in temperature conditions of the space surrounding reservoir 104 changes the volume of the gas in the reservoir to alter the pressure within the bellows 35; and, in this manner, the modulating heat valve 25 is controlled. The adjusting screw 47 is used in this instance to vary the temperature of operation of the thermostatic element 104.

It has been found that changes in atmospheric pressures can have a very decided effect on the operation of valves, and this is particularly true in railway car installations where cars may be operating at sea level or a mile or more above sea level. These variations in atmospheric pressures can affect the temperature of operation of the systems as much as four degrees or more, which in most instances is the difference between comfortable and uncomfortable temperature conditions. The present invention, however, entirely overcomes this difficulty because screw 59 and spring 58 overcome any atmospheric pressure changes in bellows 57, and a spring 159 placed between plate 48 and partition 33, together with screw 47, resists variations in pressure in chamber 30. Chamber 30 may be vented, as at 160, to prevent high pressures from building up in the chamber due to high temperatures which may develop. Bellows 57 may also be vented, if desired, as at 161. Spring 46 is sealed in bellows 37 with the air exhausted from the bellows interior so that temperature changes in chambers 30 and 31 in no way affect the operation of valve 43. Thus, the valve member 43 is a floating member moving primarily between the force of the spring on the one hand and the force of the gas or oil on the other hand; and this gas or oil pressure varies directly with the change in temperatures surrounding the thermostatic element, whether it be of the type shown in Fig. 1 or a reservoir 104, as shown in Fig. 2. Atmospheric pressures cannot affect the forces on either side of the movable valve member 43. Consequently, the action of the heating system is the same, irrespective of the atmospheric pressure changes.

Specific embodiments of the present invention have been disclosed for the purpose of illustration in compliance with the statutes. Many modifications, of course, may be made without departing from the scope and spirit of the invention.

I claim:

1. A modulating heat valve unit for a heating system comprising a closed valve casing, three chambers in the casing arranged with two end chambers and an intermediate chamber, a passage through the outer wall into the intermediate chamber, a passage through the outer wall into one end chamber, a communicating passage in the wall between the last two mentioned chambers, a movable valve member adapted to open and close the communicating passage, thermostatic responsive means operatively connected to the valve urging the valve member toward its closed position, the intermediate chamber and the end chamber opposite to the last mentioned end chamber being separated by a wall having an opening therein, a spring passing from the intermediate chamber through the said opening into the last mentioned end chamber, a closed bellows having air exhausted therefrom completely surrounding the spring and sealed around the opening in the separating wall so as to seal the end chamber from the intermediate chamber, means for operatively connecting the spring to the valve member so as to urge the valve member toward its open position, a spring in the last mentioned end chamber seated against the wall separating the intermediate and end chambers and connected to the free end of the first spring and opposing atmospheric pressure increases in the said end chamber, and manual adjusting means for adjusting the compression in the first mentioned spring.

2. A valve unit for a closed system comprising a housing having an intermediate and two end chambers therein, the intermediate and one end chamber being sealed from the atmosphere, an inlet passage through the wall of the housing into the intermediate chamber, a discharge passage through the wall of the housing in the sealed end chamber, a controlled passage in the wall separating the intermediate and sealed end chambers, a valve adapted to open and close said controlled passage, actuating bellows in the sealed chamber operatively connected to the valve, a thermostat, an operating medium in the bellows responsive to the thermostat for moving the valve relative to the controlled passage, a compression spring in the intermediate chamber extending into the end chamber opposite to the sealed end chamber, bellows surrounding the spring and sealed against the wall separating the last mentioned two chambers, the air from the last mentioned bellows being exhausted, the spring at one end being operatively connected to the valve on the side opposite to the actuating bellows, an adjustable spring seat on the other end of the spring, manual adjusting means engaging the spring seat to regulate its position and accessible at all times from the valve housing exterior, and means associated with the spring seat for fixing the position of the seat irrespective of pressure changes in the chamber.

LAWRENCE C. ANDERSON.